US011237573B2

(12) United States Patent
Ganille et al.

(10) Patent No.: US 11,237,573 B2
(45) Date of Patent: Feb. 1, 2022

(54) METHOD FOR SECURING THE OPERATION OF A SYNTHETIC VIEWING SYSTEM OF AN AIRCRAFT, ASSOCIATED COMPUTER PROGRAM PRODUCT AND SYSTEM

(71) Applicant: THALES, Courbevoie (FR)

(72) Inventors: Thierry Ganille, Merignac (FR); Emmanuel Monvoisin, Merignac (FR); Alexandre Fine, Merignac (FR); Pierre Mariani, Merignac (FR); Hélène Misson, Merignac (FR)

(73) Assignee: THALES, Courbevoie (FR)

( * ) Notice: Subject to any disclaimer, the term of this patent is extended or adjusted under 35 U.S.C. 154(b) by 286 days.

(21) Appl. No.: 16/430,127

(22) Filed: Jun. 3, 2019

(65) Prior Publication Data

US 2019/0377367 A1 Dec. 12, 2019

(30) Foreign Application Priority Data

Jun. 6, 2018 (FR) ..................................... 18 00571

(51) Int. Cl.
*G05D 1/10* (2006.01)
*G05D 1/04* (2006.01)
*G06K 9/00* (2006.01)

(52) U.S. Cl.
CPC ............. *G05D 1/106* (2019.05); *G05D 1/042* (2013.01); *G06K 9/0063* (2013.01)

(58) Field of Classification Search
CPC ...................................................... G02B 24/01
See application file for complete search history.

(56) References Cited

U.S. PATENT DOCUMENTS 8,917,191 B1 12/2014 Tiana et al.
9,733,349 B1 8/2017 Wood et al.
2018/0024237 A1 1/2018 Laplace et al.
2019/0310105 A1* 10/2019 Pippard .................. G06T 17/05
2021/0019942 A1* 1/2021 Ophir ................ G06K 9/00671

FOREIGN PATENT DOCUMENTS

FR 3 033 903 A1 9/2016
WO WO 2018/009109 A1 1/2018

OTHER PUBLICATIONS

Communication issued by the French Patent Office in counterpart French Application No. 1800571, dated Jun. 6, 2018.
Preliminary Search Report by the French Patent Office in counterpart French Application No. 18 00571 dated Apr. 11, 2019.

* cited by examiner

*Primary Examiner* — Imran K Mustafa
(74) *Attorney, Agent, or Firm* — Arent Fox LLP

(57) ABSTRACT

The invention relates to a method for securing the operation of a synthetic viewing system of an aircraft. This method comprises the steps of determining at least one control object in the field of view of the synthetic vision system and determining at least one control point belonging to each control object and verifying the consistency of the display of the synthetic vision system. The verification step comprises the sub-steps of recovering a first position corresponding to the displayed position of each control point on the corresponding outline on the display of the synthetic vision system, determining a second position of each control point on the display of the synthetic vision system and comparing the first and second positions.

12 Claims, 4 Drawing Sheets

METHOD FOR SECURING THE OPERATION OF A SYNTHETIC VIEWING SYSTEM OF AN AIRCRAFT, ASSOCIATED COMPUTER PROGRAM PRODUCT AND SYSTEM

CROSS-REFERENCE TO RELATED APPLICATIONS

This application claims priority to French Patent Application No. 18 00571, filed on Jun. 6, 2018. The disclosure of the priority application is incorporated in its entirety herein by reference.

FIELD OF THE INVENTION

The present invention relates to a method for securing the operation of a synthetic viewing system of an aircraft.

The present invention also relates to an associated computer program product and system.

More particularly, the invention falls within the technical field of Human-System Interactions (known under the acronym HSI) for controlling an aircraft including a synthetic depiction of the outside environment. Such a depiction is known under the English acronym SVS ("Synthetic Vision System") and can be displayed on a head-down or head-up display, worn or not.

BACKGROUND OF THE INVENTION

The primary flight displays (PFD) of aircraft, recent or in development, for the most part already propose a new functionality consisting of displaying such a synthetic vision system SVS.

In particular, a synthetic vision system SVS makes it possible to show the pilot and egocentric three-dimensional view of the outside environment of the aircraft in the form of a synthetic image, generally displayed using the conventional symbology of piloting. Such a view, called SVS view, is generated from the position of the aircraft (in particular longitude, latitude and altitude), its attitude (pitch, roll and yaw) and a database containing a sampling of the altitudes of the terrain as well as other elements such as obstacles, landing strips, hydrography, towns, roads, etc.

However, it has been demonstrated in particular using flight simulators that an erroneous display of an SVS view, especially on a PFD monitor, can have critical consequences for the flight. Such a display can in particular be obtained by introducing an error on one of the position or attitude parameters of the aircraft.

Thus, for example, a slow drift of the heading of the aircraft during a flight in a valley can place a mountain on an SVS view in the middle of the actual valley and push a pilot to an avoidance maneuver relative to the SVS view that leads him to face a real mountain.

According to another example, erroneous data on the radio-altitude of the aircraft can cause an abrupt rise of the terrain on the SVS view. This can in turn cause an excessive tail-down reaction from the pilot, which endangers the safety of the flight.

One can then see that there is a need to secure the functionality of synthetic vision systems SVS.

SUMMARY OF THE INVENTION

The present invention aims to secure the functionality of a synthetic vision system SVS of an aircraft to associate it with a security level meeting the critical need. The invention thus makes it possible to guarantee that a failure of a synthetic vision system SVS will not produce an erroneous SVS view that could cause a potentially dangerous reaction by the pilot.

To that end, the invention relates to a method for securing the operation of a synthetic vision system of an aircraft, the synthetic vision system providing a synthetic display of the outside environment of the aircraft according to a field of view, using first projection rules generated as a function of first measurements of the current position and the current attitude of the aircraft.

The method comprising the following steps:

- determining at least one control object in the field of view of the synthetic vision system and for the or each control object, determining at least one control point belonging to that control object;
- verifying the coherence of the display of the synthetic vision system, said display comprising an outline of the or each determined control object by using the first projection rules, said verification step comprising the following sub-steps carried out for at least one control point:
  - recovering a first position corresponding to the displayed position of this control point on the corresponding outline of the display of the synthetic vision system;
  - determining a second position of this control point on the display of the synthetic vision system, using second projection rules generated independently of the first projection rules;
  - comparing the first and second positions, the display of the synthetic vision system being inconsistent when the second position differs from the first position by at least a predetermined threshold.

According to other advantageous aspects of the invention, the method comprises one or more of the following features, considered alone or according to all technically possible combinations:

- the or at least one of the control objects corresponds to a fictitious object in the outside environment of the aircraft;
- the or at least one of the control objects corresponds to a real object in the outside environment of the aircraft and/or to an object already present on the display of the synthetic vision system;
- the or each control object is fixed in an earth-based coordinate system or is defined relative to the aircraft, preferably on a longitudinal axis of the aircraft and in front of the latter;
- the or each control object has a point or a three-dimensional object oriented in space;
- the outline of the or each control object determined on the display of the synthetic vision system is [at] least partially transparent, preferably entirely transparent;
- the second projection rules are generated from first measurements;
- the second projection rules are generated from second measurements of the current position and the current attitude of the aircraft, the first measurements and the second measurements being provided by different and independent sensors;
- the method further comprises a step for changing the display of the synthetic vision system by another display when this display of the synthetic vision system is inconsistent.

The invention also relates to a computer program product including software instructions which, when implemented by computer equipment, carry out the method as previously defined.

The invention also relates to a system for securing the operation of a synthetic vision system of an aircraft, comprising technical means configured to carry out the method as previously defined.

BRIEF DESCRIPTION OF THE INVENTION

These features and advantages of the invention will appear upon reading the following description, provided solely as a non-limiting example, and done in reference to the appended drawings, in which.

Figure 1:
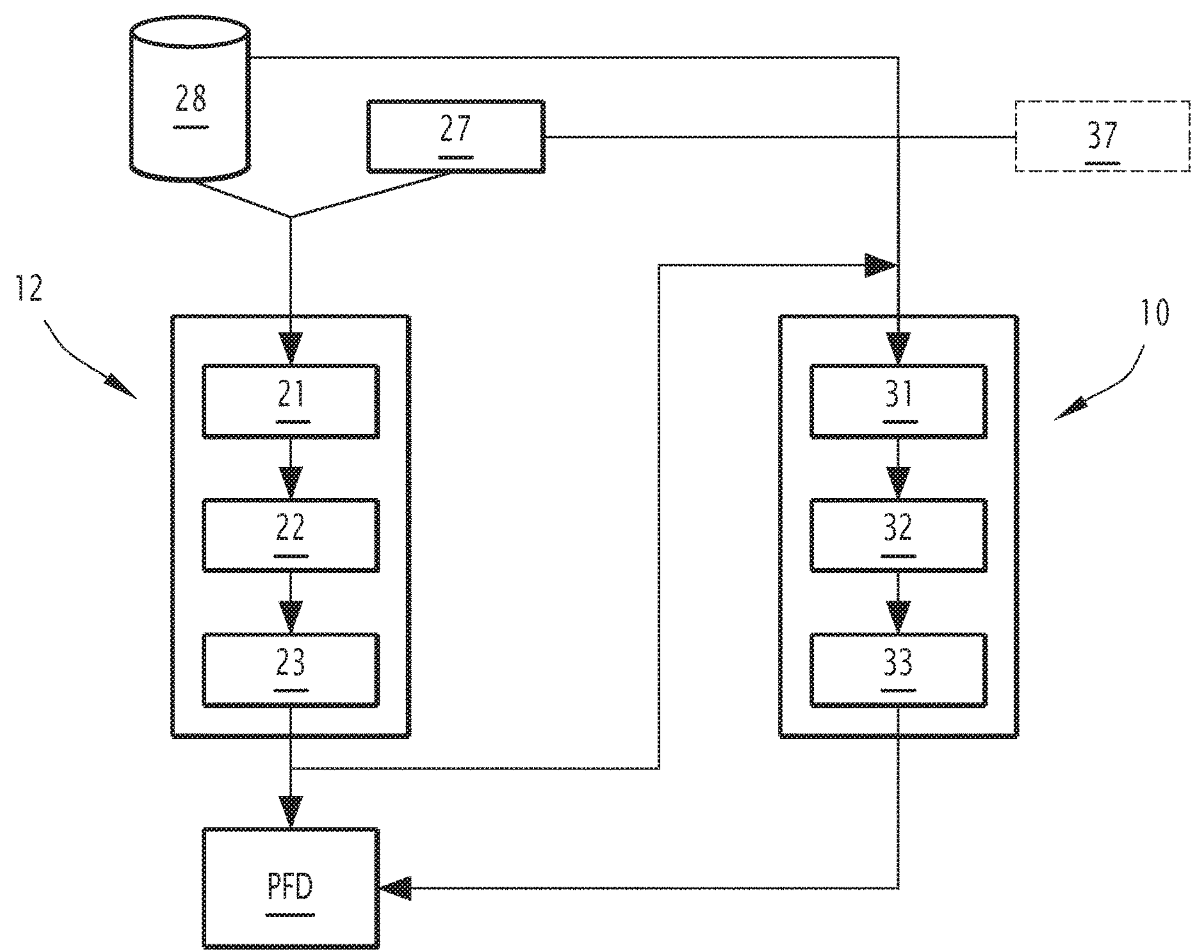
FIG. 1 is a schematic view of a system for securing the operation of a synthetic vision system of an aircraft, according to the invention.

FIG. 1 indeed illustrates a system 10 for securing the operation of a synthetic vision system 12 of an aircraft, according to the invention.

"Aircraft" refers to any vehicle flying in the Earth's atmosphere, and in particular an airplane, helicopter or drone. The aircraft can be piloted by at least one pilot directly from the cockpit thereof (case of an airplane or helicopter) or remotely, for example from a land-based control center (case of a drone or any other vehicle able to be piloted remotely).

In the exemplary embodiment described below, the aircraft is an airplane.

The synthetic vision system 12, also known under the acronym SVS, makes it possible to present the pilot of the aircraft with a three-dimensional view of the environment outside the aircraft. In the described example, the synthetic vision system 12 is on board the aircraft.

More particularly, the synthetic vision system 12 is able to provide a synthetic display of the environment outside the aircraft according to a predetermined field of view. This field of view for example corresponds to that of the pilot. As an example, this field of view is formed by a horizontal opening of 60° and a vertical opening of 50°.

To that end, in reference to FIG. 1, the synthetic vision system 12 comprises an acquisition module 21, a processing module 22 and an output module 23.

The acquisition module 21 is connected to first detectors 27 of the aircraft and to a database 28.

The first detectors 27 are capable of providing the acquisition module 21 with first measurements relative to the current position and the attitude of the aircraft. These first detectors 27 are known in themselves and for example have a sensor for signals coming from one or several satellite positioning systems and an inertial unit.

The database 28 is capable of providing the acquisition module 21 with information relative to altitudes of the terrain overflown by the aircraft as well as information relative to other elements present nearby such as obstacles, landing strips, hydrography, towns, roads, etc.

The processing module 22 is capable of analyzing the set of data acquired by the acquisition module 21 in order to generate a three-dimensional synthetic display by using first projection rules generated as a function of this data.

These first projection rules for example take the form of a projection matrix of the outside environment on a surface.

The output module 23 is able to transmit the display generated by the processing module 22 to an outside monitor to display it thereon.

The outside monitor is advantageously a primary flight display (PFD). This display is for example a head-down or head-up display.

Like the synthetic vision system 12, the securing system 10 according to the invention comprises an acquisition module 31, a processing module 32 and an output module 33.

The securing system 10 for example at least partially takes the form of an on-board computer including a memory and processor able to implement the operation of the modules 31 to 33. In this case, the modules 31 to 33 at least partially assume the form of software programs.

According to another exemplary embodiment, at least some of the modules 31 to 33 have physical components, for example programmable logic circuits, for example of the FPGA ("Field-Programmable Gate Array") type configured to carry out the operation of these modules.

The acquisition module 31 is capable of acquiring data coming from the database 28 and second measurements relative to the current position and the attitude of the aircraft.

According to one example embodiment of the invention, the second measurements are provided by the first detectors 27.

According to another example embodiment, the second measurements are provided by second detectors 37 that are separate from the first detectors 27. In particular, in this case, the second detectors 37 are detectors different from the first detectors 27 and are therefore independent therefrom. Like in the previous case, the second detectors 37 are known in themselves and for example have a sensor for signals coming from one or several satellite positioning systems and an inertial unit.

The acquisition module 31 is capable of further acquiring elements specific to the control of the display generated by the synthetic vision system 12.

The processing module 32 is capable of processing the set of data acquired by the acquisition module 31 in order to carry out at least some of the steps of the securing method according to the invention, explained in more detail hereinafter.

The output module 33 is in particular connected to the display PFD in order to modify, in some cases, the display of the synthetic vision system 12, as will be explained hereinafter.

Figure 2:
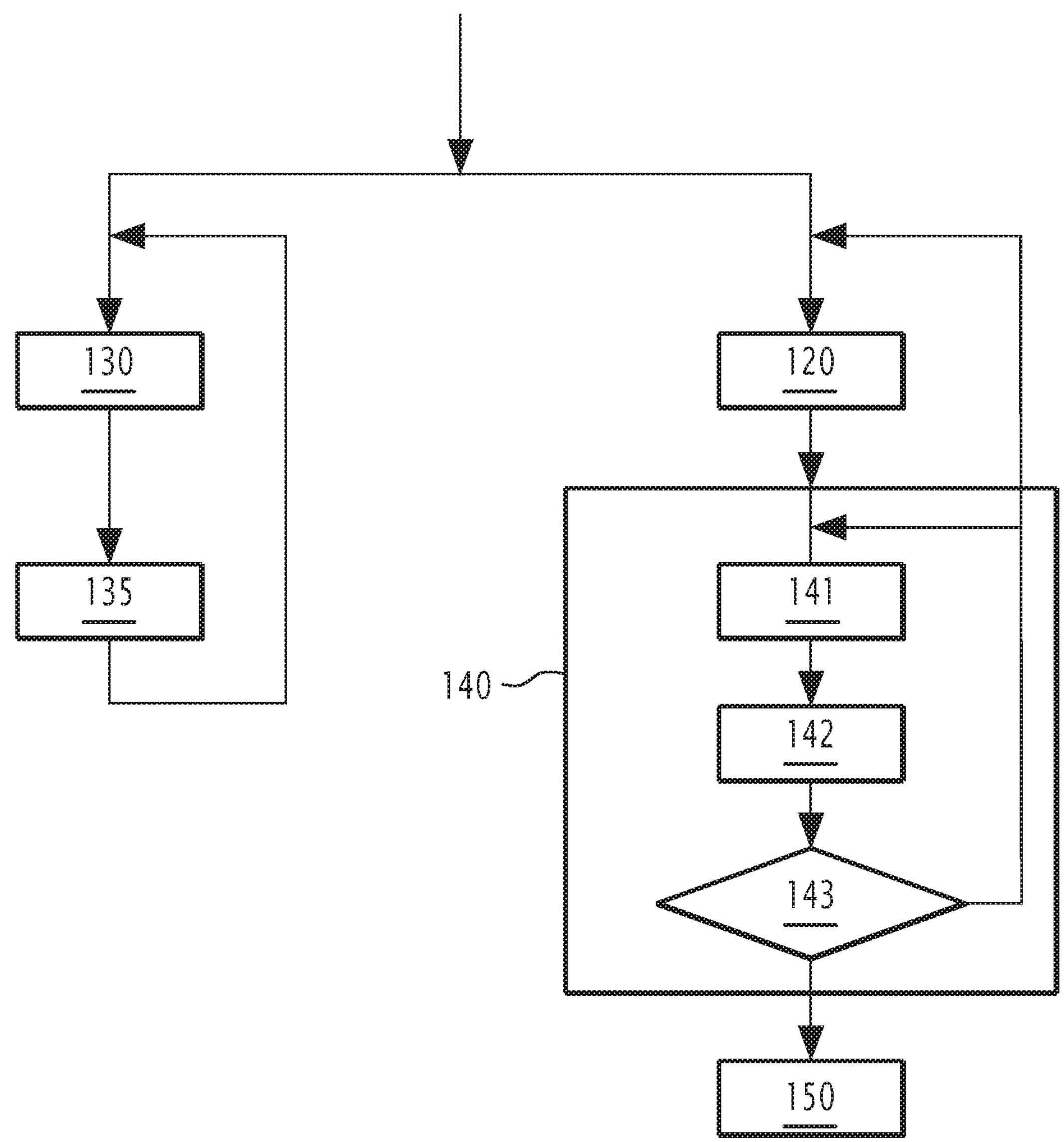
FIG. 2 is a flowchart of a securing method according to the invention, the method being carried out by the securing system of FIG. 1.

The method for securing the operation of the synthetic vision system 12 will now be explained in reference to FIG. 2, showing a flowchart of its steps.

As will be explained hereinafter, this method comprises steps 120, 140 and 150 implemented by the processing module 32 of the securing system 10 and steps 130 and 135 implemented by the processing module 22 of the synthetic vision system 12.

Initially, the aircraft is in flight and the synthetic vision system 12 provides a display at each moment to the display PFD over the course of the movement of the aircraft and the modification of its position and its attitude.

The operation of the securing system 10 is for example activated simultaneously with the operation of the synthetic vision system 12. The steps of the method described below are then executed iteratively upon each update of the positions and/or the attitude of the aircraft.

During step 120 of the method, the processing module 32 of the securing system 10 determines at least one control object in the field of view of the synthetic vision system 12.

This step 120 will be described hereinafter in connection with a single control object, the determination of the other control objects being done in the same way. Of course, in practice, multiple control objects are determined. These control objects are for example of different types and natures.

In particular, the control object has a point or a three-dimensional object oriented in space and with a known size and/or shape.

According to one example embodiment, the control object has a fictitious object, i.e., an object not present in the database 28 and in general, an object defined in the land-based coordinate system but not present in the outside environment of the aircraft.

According to another example embodiment of the invention, the control object has a real object in the outside environment of the aircraft that is for example already present on the display of the synthetic vision system 12. In this case, it involves an object coming from the database 28 that can therefore be part of the terrain, a landing strip, an obstacle, etc.

Furthermore, according to one example embodiment, the control object has a fixed position in a land-based coordinate system and when it involves a three-dimensional object, a fixed orientation in this coordinate system.

Thus, according to one example embodiment, during an approach phase of the aircraft toward an airport and below a certain distance from the threshold of the landing strip, the landing strip selected by the pilot is chosen by the processing module 32 as a control object. This example embodiment is particularly advantageous, since the role of the landing strip in the synthetic vision system 12 is particularly important during approaches. Thus, the securing of the operation of this system by a safe control object such as a landing strip is particularly interesting.

The processing module 32 is configured to determine at least one control object at any moment in the field of view of the synthetic vision system 12.

To that end, the processing module 32 for example implements the technique described hereinafter.

This technique in particular consists of defining a three-dimensional mesh of the space around the Earth from a latitude pitch LatStep, a longitude pitch LongStep and an altitude pitch AltStep. Then, the current position of the aircraft is projected from a distance ProjDist expressed in nautical miles forward along the longitudinal axis of the aircraft to calculate a point P, whereof the latitude Latitude (P), the longitude Longitude(P) and the altitude Altitude(P) are defined by the following relationships:

$$\text{Latitude}(P) = \text{Latitude}(AC) + \left(\frac{ProjDist \times \cos(\text{Heading}(AC)) \times \cos(\text{Pitch}(AC))}{60}\right);$$

$$\text{Longitude}(P) = \text{Longitude}(AC) + \left(\frac{ProjDist \times \sin(\text{Heading}(AC)) \times \cos(\text{Pitch}(AC)) \times \cos(\text{Latitude}(AC))}{60}\right);$$

$$\text{Altitude}(P) = \text{Altitude}(AC) + NMtoFeet(ProjDist) \times \sin(\text{Pitch}(AC));$$

where Heading(AC) and Pitch(AC) are respectively the heading and the pitch of the aircraft and NMtoFeet(ProjDist) is the distance ProjDist expressed in feet.

The point P thus obtained is located inside a single and same rectangular rhomb of the three-dimensional mesh. Furthermore, in light of its calculation, this point is always in the field of view of the pilot and therefore of the synthetic vision system.

The control object is for example determined by using fixed points of the rectangular rhomb in which the point P is located, for example at least some of the eight corners C1 to C8 of this rhomb. Thus, for example, the latitude Latitude (C1), the longitude Longitude(C1) and the altitude Altitude (C1) of the corner C1 are determined by using the following relationships:

$$\text{Latitude}(C1) = \left[\frac{\text{Latitude}(P)}{LatStep}\right] \times LatStep + LatStep;$$

$$\text{Longitude}(C1) = \left[\frac{\text{Longitude}(P)}{LongStep}\right] \times LongStep + LongStep;$$

$$\text{Altitude}(C1) = \left[\frac{\text{Altitude}(P)}{AltStep}\right] \times AltStep + AltStep;$$

where [ . . . ] designates the whole part.

The other points C2 to C8 are determined similarly. Furthermore, as an example, LatStep=0.1°, LongStep=0.1° and AltStep=1,000 feet.

Figure 3:
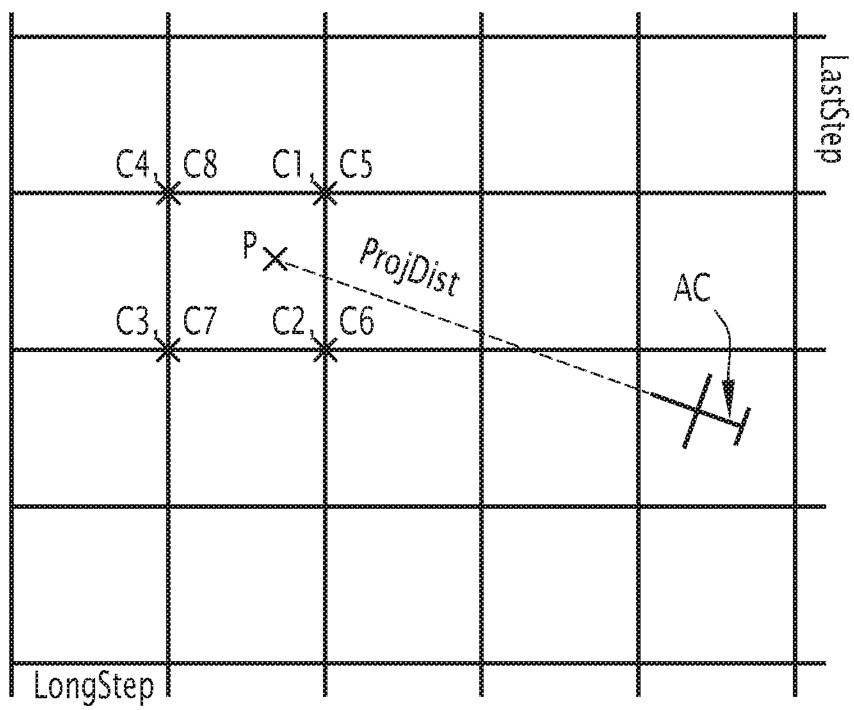
FIGS. 3 to 5 are schematic views illustrating the implementation of a step of the method of FIG. 2.
Figure 4:
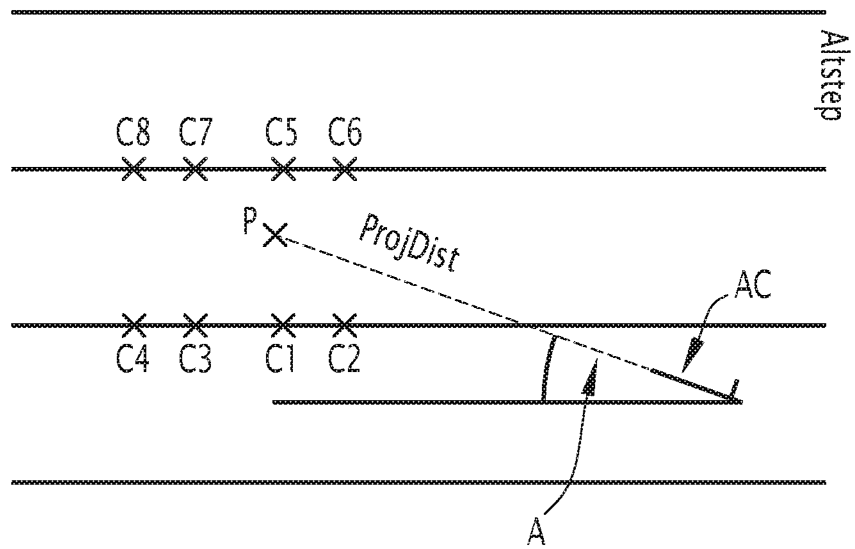

This technique is illustrated schematically in FIGS. 3 and 4, in which the aircraft is designated by reference AC.

In particular, FIG. 3 shows a horizontal diagram (top view) of the associated mesh and FIG. 4 illustrates a vertical diagram (side view) of this mesh. Furthermore, reference A in FIG. 4 designates the pitch of the aircraft AC.

Of course, other techniques can be applied to determine the control object. Furthermore, different control objects can be defined by using different techniques.

Returning to the description of step 120, according to another exemplary embodiment, the control object has a defined position relative to the aircraft.

Indeed, as is known in itself, the synthetic vision system 12 is capable of outlining the terrain facing the aircraft inside a volume defined by the field of view, but also by two planes perpendicular to the longitudinal axis of the aircraft at two fixed distances. The first of these planes is known as "near plane" and the second is known as "far plane". Thus, only the terrain situated between these two planes is outlined by the synthetic vision system, and a feared event is a distance error of the near plane that would prevent drawing an obstacle or a near relief facing the aircraft.

In this case, the control object is defined relative to the near plane for example at a fixed distance from this plane in the forward direction along the longitudinal axis of the aircraft.

Figure 5:
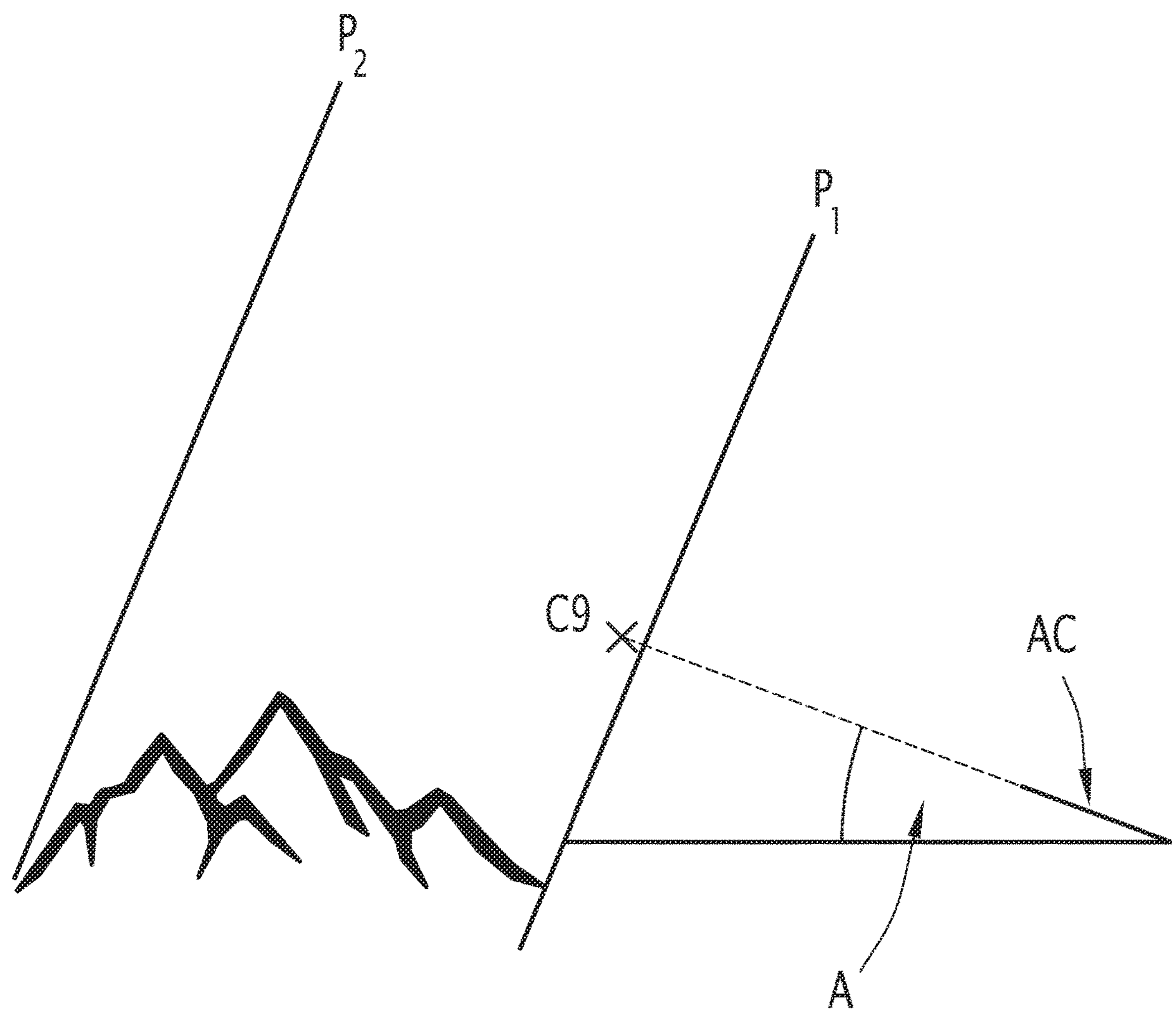

This case is illustrated schematically in FIG. 5, in which reference $P_1$ designates the proximal plane, reference $P_2$ designates the distal plane, reference A designates the pitch of the aircraft AC and reference C9 designates the chosen control object.

According to still another exemplary embodiment, in particular when the display PFD is presented on a head-up display, the choice of the control object also depends on the position of the pilot's head. Thus, in the first example when the control object is defined relative to the point P, projected from the current position at a fixed distance from the aircraft, it is possible to replace the projection of the position of the aircraft along its longitudinal axis with a projection along the line of sight of the head-up equipment.

At the end of step 120, the processing module 32 further determines at least one control point for each control object.

Thus, for example, when the control object is a point, this same point is defined as a control point. Conversely, when it involves a three-dimensional control object, each control point is chosen as a point belonging to this object. Thus, in the preceding description of the technique for determining a control object, at least some of the points C1 to C8 can be chosen as control points.

Furthermore, when a landing strip is chosen as a control object, its two ends are for example chosen as control points.

During step 130 carried out by the processing module 22 of the synthetic vision system 12 for example in parallel with step 120, this processing module 22 also determines one or several control objects and for each of them, at least one control point by using the same mechanism as that used by the processing module 32 of the securing system 10.

The control objects as well as the control points defined by the two processing modules 22, 32 are therefore identical.

Then, during the following step 135, the processing module 22 of the synthetic vision system 12 incorporates an outline of each control object determined during the preceding step 130 in its display.

These outlines are determined by using the first projection rules.

According to one exemplary embodiment, the outline of each control object is at least partially transparent on the display of the synthetic vision system 12 or is identifiable on this display by suitable symbols.

Additionally, in this case, the outline of each fictitious control object is fully transparent on the display of the synthetic vision system 12. The real objects (like for example the landing strip) remain visible.

Furthermore, during the performance of the following steps of the method, the control objects and the corresponding control points remain identifiable as such at least by the processing module 22.

During step 140 carried out by the processing module 32 of the securing system 10 after steps 120 and 135, this processing module 32 verifies the consistency of the display of the synthetic vision system 12 by using the control points determined during step 120.

In particular, this step 140 comprises three following sub-steps, carried out for each control point.

During a first sub-step 141, the processing module 32 of the securing system 10 recovers a first position corresponding to the displayed position of this control point on the outline of the display of the synthetic vision system 12.

During a second sub-step 142, the processing module 32 of the securing system 10 determines a second position of the control point on the display of the synthetic vision system 12, using second projection rules independent of the first projection rules of the synthetic vision system 12.

These second projection rules are for example similar to the first projection rules but are generated independently of the latter.

In particular, to generate these rules, the processing module 32 of the securing system 10 advantageously uses the second measurements relative to the current position and the attitude of the aircraft. As previously explained, these second measurements come from second detectors 37 different from the first detectors 27.

According to another exemplary embodiment, the second projection rules are generated by the processing module 32 of the securing system 10 from first measurements.

During a third sub-step 143, the processing module 32 of the securing system 10 compares the first and second positions.

When, during this comparison, the processing module 32 determines that the second position differs from the first position significantly for example by comparing the difference with a predetermined threshold, it concludes that the display of the synthetic vision system is inconsistent and goes to the following step 150.

Otherwise, the processing module 32 executes sub-steps 141 to 143 for another control point. When none of these points demonstrates an inconsistency in the display, the processing module 32 for example passes again to the execution of step 120.

During step 150, the processing module 32 of the securing system 10 issues an alert signaling an inconsistent display by the synthetic vision system 12 and for example modifies this display on the display PFD for a traditional two-dimensional display.

One can then see that the present invention has a certain number of advantages.

Indeed, the invention makes it possible to secure the operation of a synthetic vision system of an aircraft. The invention then makes it possible to make this operation compatible with the aeronautic criticality requirements.

In particular, when the display of such a synthetic vision system becomes inconsistent, the invention makes it possible to issue an alert and optionally to replace this inconsistent display with a reliable display.

Thus, the pilot will situate himself on the reliable display, which will make it possible to avoid actions inappropriate for the real situation of the aircraft.

The invention claimed is:

1. A method for securing an operation of a synthetic vision system of an aircraft, the synthetic vision system providing a synthetic display of an outside environment of the aircraft according to a field of view, using first projection rules generated as a function of first measurements of a current position and a current attitude of the aircraft;

the method comprising the following steps:

determining at least one control object in the field of view of the synthetic vision system and, for each determined control object, determining at least one control point belonging to the control object;

verifying a coherence of the display of the synthetic vision system, said display comprising an outline of each determined control object by using the first projection rules, said verification step comprising the following sub-steps carried out for at least one control point:

recovering a first position corresponding to the displayed position of this control point on the corresponding outline of the display of the synthetic vision system;

determining a second position of this control point on the display of the synthetic vision system, using second projection rules generated independently of the first projection rules; and comparing the first and second positions to determine whether or not the display of the synthetic vision system is inconsistent, the display of the synthetic vision system being inconsistent when the second position differs from the first position by at least a predetermined threshold; and when the display of the synthetic vision system is determined as being inconsistent, changing the display of the synthetic vision system by another display.

2. The method according to claim 1, wherein at least one of the control objects corresponds to a fictitious object in the outside environment of the aircraft, the fictitious object being an object defined in the land-based coordinate system but not present in the outside environment of the aircraft.

3. The method according to claim 1, wherein at least one of the control objects corresponds to a real object in the outside environment of the aircraft or to an object already present on the display of the synthetic vision system.

4. The method according to claim 1, wherein each control object is fixed in an earth-based coordinate system or is defined relative to the aircraft.

5. The method according to claim 4, wherein each control object is defined on a longitudinal axis of the aircraft and in front of the latter.

6. The method according to claim 1, wherein each control object presents a point or a three-dimensional object oriented in space.

7. The method according to claim 1, wherein the outline of each control object determined on the display of the synthetic vision system is at least partially transparent.

8. The method according to claim 7, wherein said outline is entirely transparent.

9. The method according to claim 1, wherein the second projection rules are generated from first measurements.

10. The method according to claim 1, wherein the second projection rules are generated from second measurements of the current position and the current attitude of the aircraft, the first measurements and the second measurements being provided by different and independent sensors.

11. A computer program product comprising software instructions which, when implemented by a piece of computer equipment, carry out the method according to claim 1.

12. A system for securing an operation of a synthetic vision system of an aircraft, the synthetic vision system providing a synthetic display of an outside environment of the aircraft according to a field of view, using first projection rules generated as a function of first measurements of a current position and a current attitude of the aircraft;

the system being adapted for:

determining at least one control object in the field of view of the synthetic vision system and, for each determined control object, determining at least one control point belonging to the control object;

verifying a coherence of the display of the synthetic vision system, said display comprising an outline of each determined control object by using the first projection rules, said verification comprising for at least one control point:

recovering a first position corresponding to the displayed position of this control point on the corresponding outline of the display of the synthetic vision system;

determining a second position of this control point on the display of the synthetic vision system, using second projection rules generated independently of the first projection rules; and comparing the first and second positions to determine whether or not the display of the synthetic vision system is inconsistent, the display of the synthetic vision system being inconsistent when the second position differs from the first position by at least a predetermined threshold; and when the display of the synthetic vision system is determined as being inconsistent, changing the display of the synthetic vision system by another display.

* * * * *